US012780698B2

(12) United States Patent
Horst et al.

(10) Patent No.: US 12,780,698 B2
(45) Date of Patent: Nov. 3, 2026

(54) METHOD FOR AUTOMATICALLY CORRECTING DEVIATIONS FROM FLUID METERING SETPOINTS

(71) Applicant: EVOQUA WATER TECHNOLOGIES LLC, Pittsburgh, PA (US)

(72) Inventors: Calvin D. Horst, Sarasota, FL (US); Michael Sumner Murphy, Sarasota, FL (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 348 days.

(21) Appl. No.: 18/554,908

(22) PCT Filed: May 17, 2022

(86) PCT No.: PCT/US2022/029582

§ 371 (c)(1),
(2) Date: Oct. 11, 2023

(87) PCT Pub. No.: WO2022/245789

PCT Pub. Date: Nov. 24, 2022

(65) Prior Publication Data

US 2024/0190734 A1 Jun. 13, 2024

Related U.S. Application Data

(60) Provisional application No. 63/189,271, filed on May 17, 2021.

(51) Int. Cl.
*C02F 1/68* (2023.01)
*C02F 1/00* (2023.01)

(52) U.S. Cl.
CPC .............. *C02F 1/685* (2013.01); *C02F 1/008* (2013.01); *C02F 2209/006* (2013.01); *C02F 2209/40* (2013.01); *C02F 2303/02* (2013.01)

(58) Field of Classification Search
CPC .. C02F 1/008; C02F 1/66; C02F 1/685; C02F 1/722; C02F 1/727; C02F 2209/006;
(Continued)

(56) References Cited

U.S. PATENT DOCUMENTS

2003/0141229 A1 7/2003 Chaffee
2011/0168609 A1 7/2011 McQuade et al.
(Continued)

FOREIGN PATENT DOCUMENTS

WO 2019161164 A1 8/2019

OTHER PUBLICATIONS

Onel Inda, Santiago, "Extended European Search Report", European Patent Application No. 22805290.8, mailed Nov. 26, 2024.
(Continued)

*Primary Examiner* — Dirk R Bass

(57) ABSTRACT

Methods of monitoring a chemical dosing subsystem for treating a fluid in a waste collection system are disclosed. The methods include deploying at least one sensor to the waste collection system, transmitting to an external controller data for a measured parameter of the fluid or treating agent, and comparing a treatment regimen determined responsive to the data to a reference protocol to determine whether the chemical dosing subsystem requires adjustment. Methods of treating a fluid in a waste collection system having a chemical dosing subsystem are also disclosed. Waste treatment management systems including a chemical dosing subsystem, a sensing subsystem, and an external controller are also disclosed. Methods of retrofitting a waste treatment management system are also disclosed.

16 Claims, 6 Drawing Sheets

(58) Field of Classification Search
CPC .............. C02F 2209/02; C02F 2209/04; C02F 2209/06; C02F 2209/08; C02F 2209/10; C02F 2209/40; C02F 2303/02
See application file for complete search history.

(56) References Cited

U.S. PATENT DOCUMENTS

| | | | |
|---|---|---|---|
| 2017/0297929 | A1 | 10/2017 | Whitaker et al. |
| 2018/0265375 | A1 | 9/2018 | Sarathy et al. |
| 2019/0218127 | A1 | 7/2019 | Wood et al. |
| 2020/0308021 | A1 | 10/2020 | Kleinguetl et al. |

OTHER PUBLICATIONS

International Search Report in corresponding PCT/US2022/029582, dated Oct. 14, 2022.

Kang, Ong Y., "Search Report and Written Opinion", Singapore Patent Application No. 11202307906Y, mailed May 22, 2026, 7 pages.

Aitsu, Keisuke, "Notice of Reasons for Refusal", Japanese Patent Application No. 2023-564065, mailed Jun. 5, 2026, 8 pages.

METHOD FOR AUTOMATICALLY CORRECTING DEVIATIONS FROM FLUID METERING SETPOINTS

CROSS-REFERENCE TO RELATED APPLICATIONS

This application is a U.S. National Phase of International Patent Application No. PCT/US2022/029582, titled "Method for Automatically Correcting Deviations from Fluid Metering Setpoints" filed May 17, 2022, which claims priority under 35 U.S.C. § 119 (e) to U.S. Provisional Application Ser. No. 63/189,271, titled "Method for Automatically Correcting Deviations from Fluid Metering Setpoints" filed May 17, 2021, which is incorporated herein by reference in its entirety for all purposes.

FIELD OF TECHNOLOGY

Aspects and embodiments disclosed herein are generally related to chemical dosing systems and, more specifically, to chemical dosing systems capable of automatic detection and adjustment of dosing variances.

SUMMARY

In accordance with one aspect, there is provided a method of monitoring a chemical dosing subsystem configured to treat a fluid in a waste collection system. The method may comprise deploying at least one sensor to the waste collection system, the at least one sensor configured to measure at least one parameter of the fluid or a treating agent introduced by the chemical dosing subsystem into the fluid. The method may comprise transmitting to an external controller a first dataset comprising at least one value for the at least one measured parameter of the fluid or the treating agent, the external controller configured to determine a treatment regimen responsive to the at least one value. The method may comprise comparing the treatment regimen to a reference protocol to determine whether the chemical dosing subsystem requires adjustment.

In some embodiments, the reference protocol is determined responsive to data retrieved from a database.

In some embodiments, the reference protocol is determined responsive to a second dataset comprising at least one value for the at least one measured parameter of the fluid or the treating agent.

In some embodiments, responsive to the chemical dosing subsystem requiring adjustment, the method further comprises transmitting to the chemical dosing subsystem instructions to initiate an adjustment protocol.

In some embodiments, the method further comprises after terminating the adjustment protocol, transmitting to the external controller a second dataset comprising at least one value for the at least one measured parameter of the fluid or the treating agent, the external controller configured to compare the second dataset to the first dataset or a reference dataset to determine whether the adjustment protocol was successful.

In some embodiments, the chemical dosing subsystem comprises a source of the treating agent and a pump configured to introduce the treating agent into the fluid, and the adjustment protocol comprises operating the pump at an increased speed for a predetermined period of time.

In some embodiments, responsive to the adjustment protocol being unsuccessful, the method further comprises transmitting to the chemical dosing subsystem instructions to initiate a second adjustment protocol. The second adjustment protocol may comprise operating the pump at a fractional speed; measuring flow rate of the treating agent into the fluid; transmitting to the external controller a third dataset comprising at least one value for the measured flow rate of the treating agent; and comparing the third dataset to a reference flow rate range to determine whether the chemical dosing subsystem requires a third adjustment.

In some embodiments, the chemical dosing subsystem comprises more than one pump configured to introduce the treating agent into the fluid, and responsive to the third dataset being outside a threshold discrepancy of the reference flow rate range, the method further comprises transmitting to the chemical dosing subsystem instructions to initiate the third adjustment protocol. The third adjustment protocol may comprise shutting off a first pump; operating a second pump at a fractional speed; measuring flow rate of the treating agent into the fluid; transmitting to the external controller a fourth dataset comprising at least one value for the measured flow rate of the treating agent; and comparing the fourth dataset to the reference flow rate range to determine whether the chemical dosing subsystem requires a fourth adjustment.

In some embodiments, the method further comprises deploying at least one second sensor to the waste collection system, the at least one second sensor configured to measure the at least one parameter of the fluid or the treating agent.

In some embodiments, the method further comprises transmitting to the external controller a second dataset comprising at least one value for an indicator of the chemical dosing subsystem activity and comparing the second dataset to the reference protocol to determine whether the chemical dosing subsystem requires adjustment.

In some embodiments, the chemical dosing subsystem comprises a source of the treating agent and a pump configured to introduce the treating agent into the fluid, and the indicator comprises at least one of volume of the source of the treating agent and number of revolutions of the pump.

In accordance with another aspect, there is provided a method of treating a fluid in a waste collection system having a chemical dosing subsystem configured to introduce at least one treating agent into the fluid in accordance with a predetermined treatment protocol. The method may comprise deploying at least one sensor to the waste collection system, the at least one sensor configured to measure at least one parameter of the fluid or the at least one treating agent. The method may comprise transmitting to an external controller a first dataset comprising at least one value for the at least one measured parameter of the fluid or the treating agent, the external controller configured to determine a treatment regimen responsive to the at least one value and data retrieved from a database. The method may comprise transmitting to the chemical dosing subsystem data comprising the treatment regimen, the chemical dosing subsystem configured to adjust the predetermined treatment protocol responsive to the treatment regimen to produce an adjusted treatment protocol.

In some embodiments, the at least one parameter of the treating agent is flow rate of the at least one treating agent into the fluid.

In some embodiments, the at least one parameter of the fluid is associated with a rate of introducing the at least one treating agent into the fluid.

In some embodiments, the at least one parameter of the fluid comprises flow rate, concentration of the treating agent, concentration of a target species to be treated, pH, temperature, total suspended solids (TSS), total dissolved solids (TDS), biological oxygen demand (BOD), chemical oxygen demand (COD), conductivity, and oxidation reduction potential (ORP).

In some embodiments, the data retrieved from the database comprises historical values for the at least one measured parameter, historical data for the treatment regimen, and/or historical, measured, or predictive environmental data.

In accordance with another aspect, there is provided a waste treatment management system. The waste treatment management system may comprise a waste collection system directed to a principal processing facility. The waste treatment management system may comprise a chemical dosing subsystem comprising a source of at least one treating agent and at least one pump configured to introduce the at least one treating agent into a fluid within the waste collection system in accordance with a predetermined treatment protocol. The waste treatment management system may comprise a sensing subsystem comprising at least one sensor configured to measure at least one parameter of the fluid or the at least one treating agent. The waste treatment management system may comprise an external controller operably connected to the chemical dosing subsystem and the sensing subsystem. The external controller may be configured to receive data comprising at least one value for the at least one measured parameter of the fluid or the at least one treating agent; determine a treatment regimen responsive to the at least one value; compare the treatment regimen to a reference protocol to determine whether the chemical dosing subsystem requires adjustment; and responsive to the chemical dosing subsystem requiring adjustment, transmit to the chemical dosing subsystem instructions to initiate an adjustment protocol.

In some embodiments, the controller is further configured to transmit to the chemical dosing subsystem the treatment regimen. The chemical dosing subsystem may be further configured to adjust the predetermined treatment protocol responsive to the treatment regimen to produce an adjusted treatment protocol.

In some embodiments, the chemical dosing subsystem comprises more than one pump, each pump comprising a transmitter and receiver operably connected to the external controller.

In some embodiments, the at least one sensor configured to measure a parameter of the treating agent is a flow meter or volumetric meter.

In some embodiments, the at least one sensor configured to measure a parameter of the fluid is configured to measure at least one of flow rate, concentration of the treating agent, concentration of a target species to be treated, pH, temperature, total suspended solids (TSS), total dissolved solids (TDS), biological oxygen demand (BOD), chemical oxygen demand (COD), conductivity, and oxidation reduction potential (ORP).

In some embodiments, the chemical dosing subsystem is positioned proximate to the sensing subsystem.

In some embodiments, the chemical dosing subsystem is positioned remote from the sensing subsystem.

In accordance with another aspect, there is provided a method of retrofitting a waste treatment management system. The method may comprise providing an external controller operably connectable to a sensing subsystem and a chemical dosing subsystem. The external controller may be configured to receive data comprising at least one value for at least one measured parameter of a fluid or a treating agent from the sensing subsystem; determine a treatment regimen responsive to the at least one value and data retrieved from a database; and compare the treatment regimen to a reference protocol to determine whether the chemical dosing subsystem requires adjustment. The method may comprise providing instructions to operably connect the external controller to the sensing subsystem and the chemical dosing subsystem.

In some embodiments, the method further comprises providing a pump of the chemical dosing subsystem and providing instructions to operably connect the pump to the external controller.

In some embodiments, the method further comprises providing a sensor of the sensing subsystem and providing instructions to deploy the sensor to the waste collection system to measure a parameter of the fluid or the treating agent and operably connect the sensor to the external controller.

The disclosure contemplates all combinations of any one or more of the foregoing aspects and/or embodiments, as well as combinations with any one or more of the embodiments set forth in the detailed description and any examples.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Waste treatment management systems are generally composed of extensive networks of pipes and drains that direct a waste fluid to one or more treatment stations. Monitoring and neutralization of contaminants and undesirable species, such as odorous or controlled species, are typically performed at various points within the extensive network. Thus, various chemical dosing sites and sensors may be deployed throughout the waste treatment management system to monitor and/or neutralize such contaminants.

Within the waste treatment management system, chemical dosing sites may require adjustment from time to time, for example, to remove blockages or troubleshoot other problems. Because the chemical dosing sites are scattered throughout the network and may be difficult to access, monitoring of these sites often relies on infrequently scheduled maintenance checks. As a result, chemical dosing sites may operate under suboptimal conditions for extended periods of time without detection. There exists a need for remote monitoring and detection of issues with chemical dosing sites within a waste treatment management system. Further-more, there exists a need for automatic detection of issues, and optionally automatic and remote correction of issues and maintenance of chemical dosing sites within a waste treatment management system.

The systems and methods disclosed herein may be employed to determine whether a chemical dosing site requires an adjustment and perform one or more adjustment protocols as directed remotely, for example, without manual intervention at the chemical dosing site. In certain embodiments, the systems and methods disclosed herein may be employed to determine whether the chemical dosing site requires an adjustment and perform one or more adjustment protocols automatically, for example, as directed by a controller.

The systems and methods disclosed herein may be employed for use with fluid waste collection systems. In certain instances, the disclosure may refer to wastewater and/or municipal water treatment systems. However, it should be noted that the systems and methods disclosed herein may similarly be employed in association with any source of water including contaminants or undesirable species. For example, the waste fluid may be associated with a water purification, nuclear power generation, microelectronics manufacturing, semiconductor manufacturing, food processing (including agricultural uses and irrigation), textile manufacturing, paper manufacturing and recycling, pharmaceutical manufacturing, chemical processing, and metal extraction system or process. The waste fluid may be associated with industrial applications, for example, with the removal of contaminants from industrial wastewaters.

Figure 1:
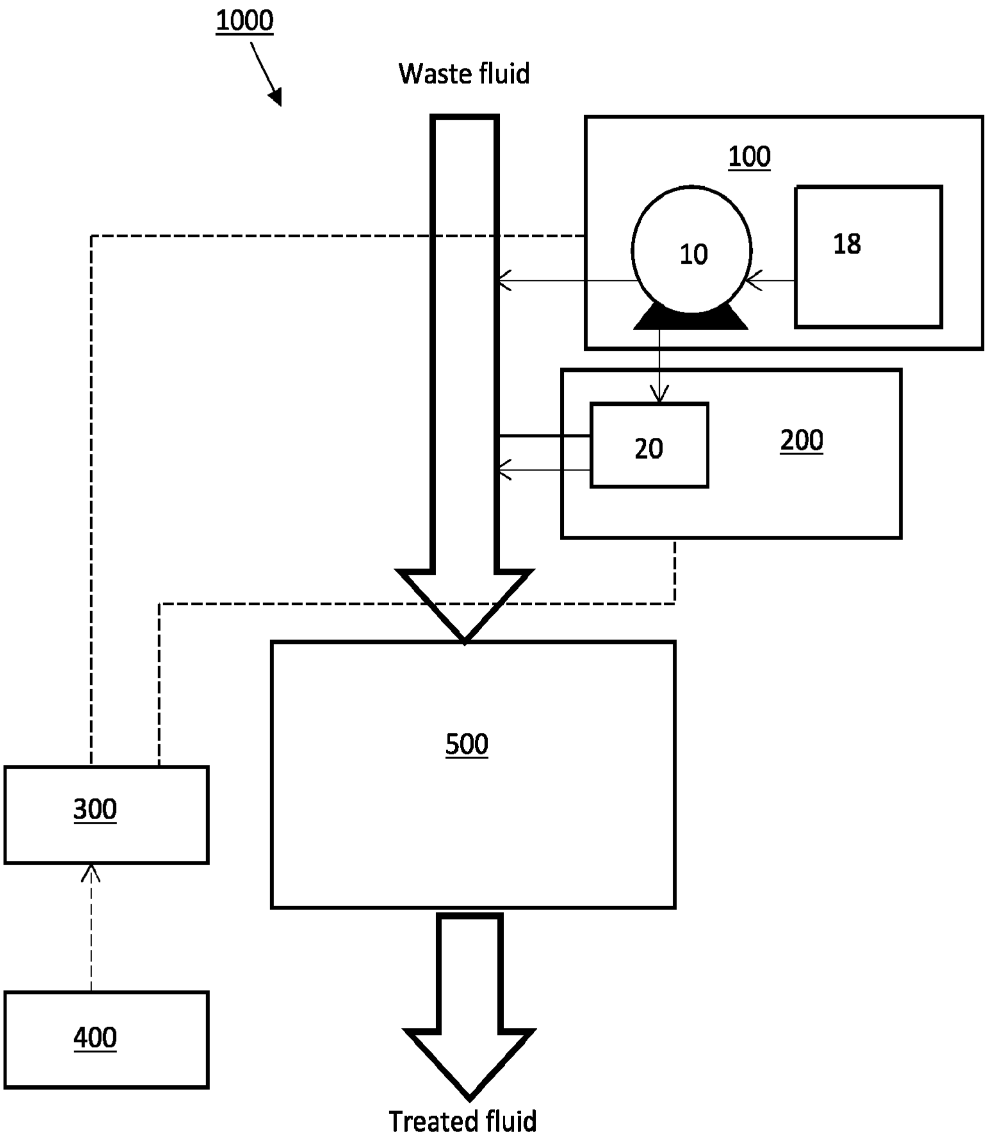
FIG. 1 is a box diagram of a waste treatment management system, in accordance with one embodiment.

Referring to FIG. 1, in accordance with one aspect, there is provided a waste treatment management system 1000. The waste treatment management system 1000 includes a waste stream collection system directed to a principal processing facility 500 configured to treat the waste fluid and produce a treated fluid.

The waste treatment management system 1000 may comprise a chemical dosing subsystem 300 fluidly connected to the waste stream collection system. The chemical dosing subsystem 300 may be configured to introduce at least one treating agent into a fluid within the waste collection system. As shown in FIG. 1, the chemical dosing subsystem 300 may comprise a source of the treating agent 18 and a pump 10 for introducing the treating agent into the fluid in accordance with a predetermined treatment protocol.

The waste treatment management system may comprise a sensing subsystem 200 having at least one sensor 20 configured to measure at least one parameter of the fluid or the at least one treating agent. As shown in FIG. 1, the sensor 20 may be positioned to measure a parameter of the chemical dosing subsystem 300 and/or the waste collection system.

In some embodiments, at least one sensor 20 is configured to measure a parameter of the treating agent. The sensor 20 measuring a parameter of the treating agent may be a flow meter or a volumetric meter. A flow meter may be positioned downstream from pump 10. The flow meter may be configured to measure the current chemical dosing rate applied by the dosing subsystem, within tolerance in accordance with calibration of the instrument. An adjustment factor may optionally be applied to the measured dose rate to obtain a current dose rate value within a selected precision, as described in more detail below. A volumetric meter may be associated with source of treating agent 18 to measure volume of the dosing agent within the system.

In some embodiments, the at least one sensor 20 is configured to measure a parameter of the fluid within the waste collection system. The sensor 20 measuring a parameter of the fluid may be configured to measure at least one of flow rate, concentration of the treating agent, concentration of a target species to be treated, pH, temperature, total suspended solids (TSS), total dissolved solids (TDS), biological oxygen demand (BOD), chemical oxygen demand (COD), conductivity, and oxidation reduction potential (ORP).

The sensor 20 measuring a parameter of the fluid may be positioned upstream from the chemical dosing subsystem 300. A sensor positioned upstream from the chemical dosing subsystem may measure a parameter used to determine a chemical dosing rate to be applied by the dosing subsystem for desired treatment of the fluid.

The sensor 20 measuring a parameter of the fluid may be positioned downstream from the chemical dosing subsystem 300. A sensor positioned downstream from the chemical dosing subsystem may measure a parameter used to determine an actual chemical dosing rate being applied by the dosing subsystem. Thus, the sensor may be used to determine whether the chemical dosing subsystem requires adjustment.

The waste treatment management system may comprise an external controller 300 operably connected to the chemical dosing subsystem 100 and the sensing subsystem 200. In certain embodiments, the external controller 300 may be operably connected to one or more pump 10 and/or one or more sensor 20. The external controller may receive data from the sensing subsystem 200 comprising at least one value for the at least one measured parameter of the fluid or the treating agent. The external controller 300 may transmit instructions to the chemical dosing subsystem 100, including, for example, instructions to operate in accordance with a treatment regimen or adjusted treatment regimen. The external controller 300 may comprise a data transmitter and a data receiver. The external controller 300 may be operably connected to the chemical dosing subsystem 100 and the sensing subsystem 200 by wired or wireless connection. In certain embodiments, one or more of the external controller 300, chemical dosing subsystem 100 and sensing subsystem 200 are connected to a system operating module. The system operating module may be stored and operated on a computing device, such as the external controller 300 or another computing device, or stored and operated on the cloud and be accessible by webpage.

The external controller 300 may be operably connected to a database 400. The external controller 300 may receive data from the database 400 comprising, for example, historical values for the measured parameter, historical data for the treatment regimen, and/or historical, measured, or predictive environmental data. The database 400 may comprise or be operably connected to a memory storage device. The memory storage device may be a local or cloud-based memory storage device. The database 400 may comprise or be operably connected to a source of environmental data.

The controller 300 may be associated with or more processors typically connected to one or more memory devices (optionally the database 400 or another memory device), which can comprise, for example, any one or more of a disk drive memory, a flash memory device, a RAM memory device, or other device for storing data. The memory device may be used for storing programs and data during operation of the system. For example, the memory device may be used for storing historical data relating to the parameters over a period of time, as well as operating data. In some embodiments, the controller(s) disclosed herein may be operably connected to an external data storage. For instance, the controller may be operable connected to an external server and/or a cloud data storage (optionally the database 400 or another server).

Any controller(s) disclosed herein may be a computer or mobile device or may be operably connected to a computer or mobile device. The controller may comprise a touch pad or other operating interface. For example, the controller may be operated through a keyboard, touch screen, track pad, and/or mouse. The controller may be configured to run software on an operating system known to one of ordinary skill in the art. The controller may be electrically connected to a power source.

The controller(s) disclosed herein may be electrically connected to the one or more components. The controller may be connected to the one or more components through a wireless connection. For example, the controller may be connected through wireless local area networking (WLAN) or short-wavelength ultra-high frequency (UHF) radio waves. The controller may further be operably connected to any additional pump or valve within the system, for example, to enable the controller to direct fluids or additives as needed. The controller may be coupled to a memory storing device or cloud-based memory storage.

The controller(s) disclosed herein may be configured to transmit data to a memory storing device or a cloud-based memory storage. Such data may include, for example, operating parameters, measurements, and/or status indicators of the system components. The externally stored data may be accessed through a computer or mobile device. In some embodiments, the controller or a processor associated with the external memory storage may be configured to notify a user of an operating parameter, measurement, and/or status of the system components. For instance, a notification may be pushed to a computer or mobile device notifying the user. Operating parameters and measurements include, for example, properties of the fluid in the waste collection system or treating agent. Status of the system components may include, for example, status of one or more sensor, pump, or source of a treating agent, such as whether the system component is offline (disconnected from the external controller 300), has lost power, requires adjustment, requires maintenance (planned or unplanned maintenance), and/or fill level of the source of the treating agent. However, the notification may relate to any operating parameter, measurement, or status of a system component disclosed herein. The controller may further be configured to access data from the memory storing device or cloud-based memory storage. In certain embodiments, information, such as system updates, may be transmitted to the controller from an external source.

Multiple controllers may be programmed to work together to operate the system. For example, one or more controller may be programmed to work with an external computing device. In some embodiments, the controller and computing device may be integrated. In other embodiments, one or more of the processes disclosed herein may be manually or semi-automatically executed.

The external controller 300 may comprise a processor. The external controller 300 may be configured to receive the at least one value for the at least one measured parameter of the fluid or treating agent and determine a treatment regimen responsive to the at least one value, in accordance with the methods disclosed herein. For instance, the external controller 300 may be configured to compare the treatment regimen to a reference protocol to determine whether the chemical dosing subsystem requires adjustment. Responsive to the chemical dosing subsystem requiring adjustment, the controller may be configured to transmit to the chemical dosing subsystem instructions to initiate an adjustment protocol. In some embodiments, the controller is further configured to transmit to the chemical dosing subsystem the treatment regimen. In response, the chemical dosing subsystem may be configured to adjust the predetermined treatment protocol responsive to the treatment regimen to produce an adjusted treatment protocol. Thus, the controller may be programmable or programmed to execute one or more method or method steps disclosed herein.

Figure 2:
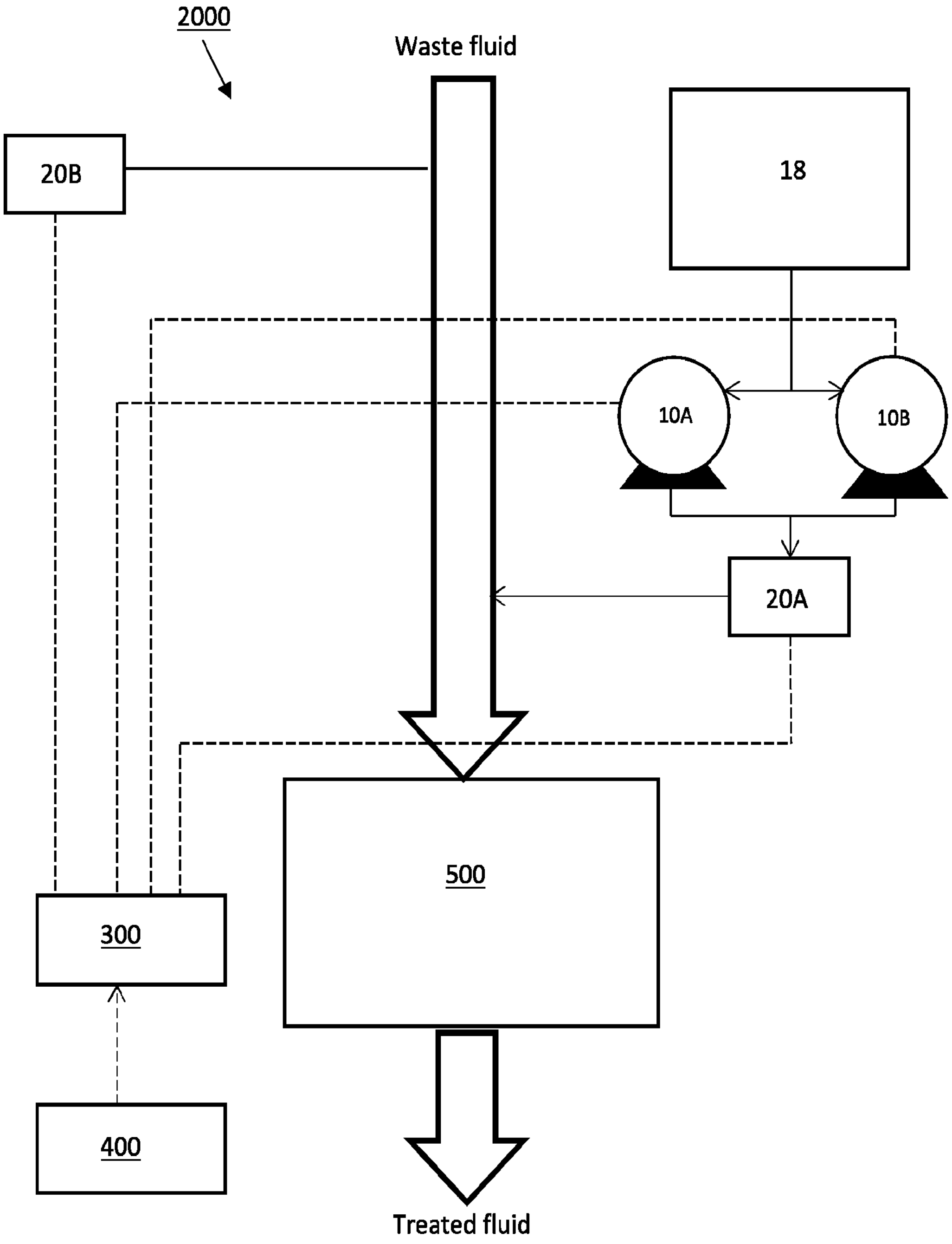
FIG. 2 is a box diagram of a waste treatment management system, in accordance with one embodiment.

In some embodiments, as shown in FIG. 2, the waste treatment management system 2000 may comprise more than one pump 10A, 10B. For instance, the chemical dosing subsystem 100 may comprise more than one pump 10A, 10B. Each pump 10A, 10B may comprise a transmitter and receiver and be operably connected to the external controller 300. Each pump 10A, 10B may be fluidly connected to source of treating agent 18. In other embodiments, each of two or more pumps 10A, 10B may be fluidly connected to a corresponding source of treating agent.

In some embodiments, as shown in FIG. 2, the waste treatment management system 2000 may comprise more than one sensor 20A, 20B. For instance, the sensing subsystem 200 may comprise more than one sensor 20A, 20B. Each sensor 20A, 20B may comprise a transmitter and receiver and be operably connected to the external controller 300. Each sensor may be configured to measure the same or a different parameter. As shown in FIG. 2, one sensor 20A may be associated with two or more pumps 10A, 10B and configured to measure a parameter of the treating agent. A second sensor 20B may be configured to measure a parameter of the fluid within the waste collection system. In other embodiments, each sensor 20A, 20B may be associated with a corresponding pump 10A, 10B.

In some embodiments, the system may comprise more pumps than sensors. For instance, the system may comprise at least 1×+1 more pumps than sensors, 1.5× more pumps than sensors, 3× more pumps than sensors, 4× more pumps than sensors, or more.

In some embodiments, the system may comprise more sensors than pumps. For instance, the system may comprise at least 1×+1 more sensors than pumps, 1.5× more sensors than pumps, 3× more sensors than pumps, 4× more sensors than pumps, or more.

In some embodiments, the chemical dosing subsystem is positioned proximate to the sensing subsystem. For instance, the sensing subsystem may be positioned upstream or downstream from the chemical dosing subsystem in close proximity within the waste collection system. The chemical dosing subsystem and the sensing subsystem may be positioned on a skid. The sensing subsystem may be positioned within 10 feet (about 3 meters), 25 feet (about 7.6 meters), 50 feet (about 15.2 meters), or 100 feet (about 30.5 meters) from the chemical dosing subsystem. In some embodiments, the sensing subsystem may be positioned downstream from the chemical dosing subsystem and upstream from the waste collection subsystem.

In some embodiments, the chemical dosing subsystem is positioned remote from the sensing subsystem. For instance, the sensing subsystem may be positioned remotely upstream or downstream from the chemical dosing subsystem within the waste collection system. The sensing subsystem may be positioned more than 25 feet (about 7.6 meters), more than 50 feet (about 15.2 meters), more than 100 feet (about 30.5 meters), or more than 300 feet (about 91.4 meters) from the chemical dosing subsystem.

In some embodiments, the sensor may be a flow meter. The flow meter may be configured to measure the current chemical dosing rate applied by the dosing subsystem, within tolerance in accordance with calibration of the instrument. The flow meter may generally be calibrated to an average daily flow rate of the dosing subsystem. However, at high and low dose rates (which sometimes occur for brief periods of the day), the flow meter may experience a 0-7% error. Thus, in some embodiments, an adjustment factor may be applied to the flow meter measurement at selected ranges. For instance, the flow meter or external controller may apply an adjustment factor to the measured flow rate when the value is high, for example, within 1.5×-3.0× of the calibrated range (or up to a maximum flow rate of the system) or when the value is low, for example, within 0.01×-0.1× of the calibrated range. The adjustment factor may be 0.5-7%, for example, about 0.5%, 1.0%, 1.5%, 2.0%, 2.5%, 3.0%, 4.0%, 5.0%, 6.0%, or 7.0%. The adjustment factor may be selected to obtain a value for the measurement within 0-3% precision of the dose rate, when not accounting for compounding instrument error, for example, within about 0%, 0.1%, 0.5%, 1.0%, 1.5%, 2.0%, 2.5%, or 3.0% precision of the dose rate.

In one exemplary embodiment, a system designed with a maximum instantaneous dosing agent flow rate capacity of 4000 ml/min may operate at an average daily flow rate of 2000 ml/min, but experience brief periods of a maximum 4000 ml/min or minimum 100 ml/min. A flow meter used with such a system may be calibrated to 2000 ml/min and be accurate within tolerance of the instrument at the calibrated flow rate. The flow meter may deviate slightly at the high and low ends of the dose rates by a 0-7% error on a continuum. An adjustment factor may be applied to the actual measurement of the flow meter, effective to provide a value within 2% precision of the dose rate, when not accounting for compounding instrument error.

In certain exemplary embodiments, the flow meter may be a contactless flow meter. The flow meter may be configured to be mounted on a pipe carrying fluid or treating agent, for example, to substantially surround the pipe. The flow meter may be sized to fit a pipe having a diameter of 0.10 in. to 0.25 in. (2.7 mm to 6.35 mm), 0.25 in. to 2.0 in. (6.35 mm to 5.1 cm), or 1.5 in. 8.0 in. (3.8 cm to 20.3 cm). Exemplary contactless liquid flow meters include FD-X, FD-Q, and FD-R series flow meters (distributed by Keyence Corporation, Itasca, IL). Exemplary contactless gas flow meters include FD-G series flow meters (distributed by Keyence Corporation, Itasca, IL).

The flow meter may be an ultrasonic flow meter. Ultrasonic flow meters typical monitor flow rate by measuring the time it takes for an ultrasonic pulse to travel from an ultrasonic transmitting element on a first side of the flow to an ultrasonic receiving element on a second side of the flow. As flow rate increases, the ultrasonic signal is typically accelerated transmission time decreases. Transmission time may be directly correlated to the instantaneous flow rate. In some embodiments, the ultrasonic flow meters simultaneously monitor two signals (one moving in the direction of flow and one moving against the direction of flow) to provide more consistent and stable readings.

Figure 3:
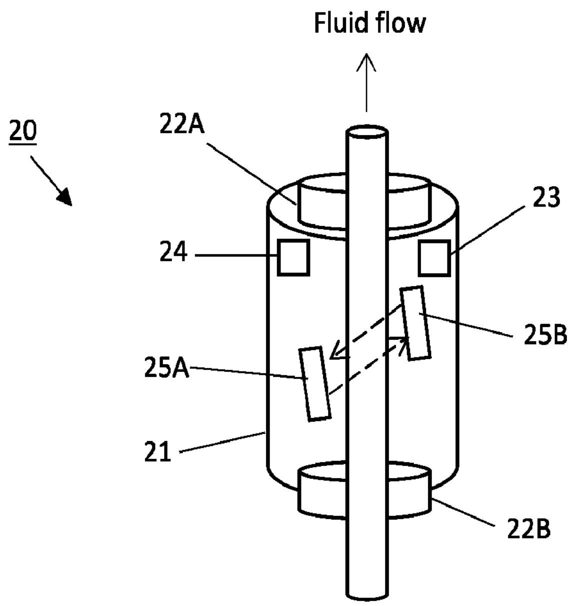
FIG. 3 is a sectional view of a flow meter, in accordance with one embodiment.

FIG. 3 is a sectional view of one exemplary ultrasonic contactless flow meter 20. The flow meter 20 includes housing 21, clamps 22A, 22B for securing the flow meter 20 to a pipe, transmitter 23 and receiver 24 for communicating with external controller 300, and ultrasonic transmitting element 25A and ultrasonic receiving element 25B for measuring flow rate.

In certain exemplary embodiments, the pump may be a remotely controlled pump. The pump may be configured to operate in a variety of modes, including forwards and backwards at a variety of speeds. The pump may be configured to operate at least at a maximum speed and a fractional speed, for example, at least one or more of 25% speed, 50% speed, and 75% speed in the forward and/or backward modes. In some embodiments, the pump may be configured to operate at any selected speed. The pump may be capable of detecting and notifying a user of one or more operating event, such as a leak, unexpected resistance, or a component requiring unexpected or scheduled maintenance.

The pump may be operated in a manual control mode or automatic mode. In automatic mode, the pump may be operated by instructions received from the external controller. As described herein, the external controller may be configured to instruct the pump to operate in accordance with a treatment regimen determined responsive to information received from one or more sensor and/or database. The external controller may also provide the pump with instructions to operate one or more adjustment protocol. One exemplary pump is qdos™ pump (distributed by Watson-Marlow™ Limited, Falmouth, United Kingdom).

Figure 4:
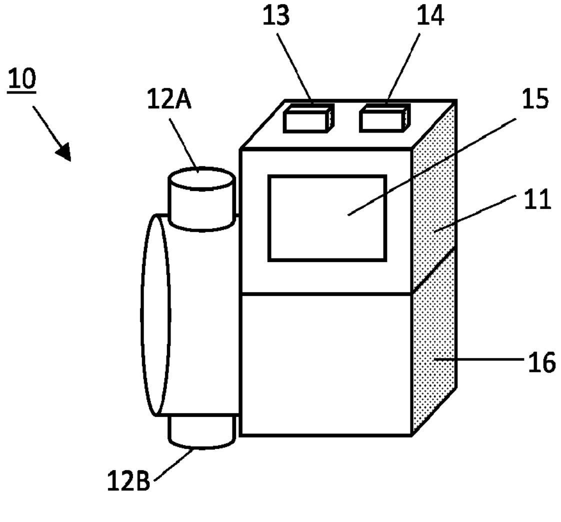
FIG. 4 is a schematic diagram of a pump, in accordance with one embodiment.

FIG. 4 is a schematic diagram of a remotely controlled pump 10. The pump 10 includes housing 11, fluid inlet and outlet 12A, 12B, transmitter 13, receiver 14, user interface 15, and drive unit 16.

The waste treatment management system may comprise a plurality of sensing subsystems or monitoring stations each situated in the waste stream collection system. Each monitoring station may have at least one sensor configured to determine parameter of a fluid within the waste collection system, such as a level of at least one target species, at respective locations of the waste stream collection system. The sensors may be configured to transmit a representation of the determined level of the at least one target species to the external controller. The system may comprise the treating station or chemical dosing subsystem disposed at, proximate, or remotely from at least one of the plurality of monitoring stations.

The external controller may be configured to receive the transmitted representation and to determine a treatment regimen or adjusted dosage of the at least one treating agent based on the measurement of the target species or fluid parameter and/or data retrieved from a public database. The data retrieved from a database may include environmental data regarding one or more of precipitation, outdoor temperature, outdoor relative humidity, wind speed, wind direction, and atmospheric pressure. The external controller may further be configured to transmit an indicator of the adjusted dosage to the treating station, wherein the treating station is further configured to receive the indicator of the adjusted dosage and introduce the at least one treating agent at the adjusted dosage.

In some embodiments, the target species is a contaminant or an odor-causing species in the fluid. In some embodiments, the at least one sensor is configured to determine a concentration of one of $H_2S$ or a precursor for $H_2S$ in one of air or water within the collection system. The system may comprise an aeration system configured to deliver an oxygen containing gas into the wastewater.

The at least one treating agent may be an agent configured to control, treat, or reduce the odor-causing contaminant in the fluid. The treating agent may comprise at least one of an anthraquinone, a pH-adjusting compound, a nitrite, a nitrate, sodium chlorite, hydrogen peroxide, or an iron salt solution. In exemplary embodiments, oxygen bubbles or bubbles of an oxygen containing gas introduced into wastewater in the wastewater stream collection system constitutes a treating agent. The oxygen or gas bubbles may be used to manipulate the oxidation-reduction potential of the wastewater.

In some embodiments, each of the plurality of monitoring stations or sensing subsystems may be configured to transmit the representation of the parameter of the fluid or treating agent to the external controller according to a predetermined schedule. The external controller may be configured to adjust operation of one or more of the plurality of treating stations to compensate for undesired operation of one or more other of the plurality of treating stations.

Methods of retrofitting a waste treatment management system are disclosed herein. The methods may include providing one or more of the external controller, the chemical dosing subsystem, or the sensing subsystem. The methods may comprise providing a sensor and/or a pump for introducing the treating agent into the fluid in the waste collection system. The methods may comprise providing a source of a treating agent.

The methods may comprise providing instructions to operably connect the external controller to at least one of the sensing subsystem and the chemical dosing subsystem. In some embodiments, the methods may comprise operably connecting the external controller to one or more of the sensing subsystem and the chemical dosing subsystem. The methods may comprise programming the controller in accordance with the methods disclosed herein. The methods may comprise manually setting one or more operating parameter for the chemical dosing subsystem and/or the pump, for example, to be instructed by the external controller. The methods may comprise selecting, for example, pump speed, treating agent dose rate, flow rate, dose frequency, and sensor measuring frequency.

In some embodiments, the method further comprises providing instructions to operably connect the pump to the external controller. In some embodiments, the method further comprises providing instructions to deploy the sensor to the waste collection system to measure a parameter of the fluid or the treating agent and operably connect the sensor to the external controller.

In accordance with another aspect, there is provided a method of monitoring a chemical dosing subsystem. The method may comprise deploying at least one sensor to a waste collection system. The sensor may be configured to measure at least one parameter of the fluid in the waste collection system or a treating agent introduced by the chemical dosing subsystem into the fluid. Deploying the sensor may include one or more of selecting a location for the sensor, installing the sensor at the selected location, selecting one or more operating parameters for the sensor, for example, one or more initial operating parameters for the sensor, and operably connecting the sensor to an external controller. The sensor may be fluidly connected to a fluid or gas (for example, headspace) of the waste collection system. The sensor may be positioned to measure a parameter of the treating agent, for example, the sensor may be installed on a pipe carrying the treating agent.

The sensor may be programmed to initially measure and/or transmit to the external controller a dataset comprising at least one value for the measured parameter on a predetermined schedule. In some embodiments, the dataset may be transmitted once a day, twice a day, four times a day, every 2 hours, every hour, every 30 minutes, or every 15 minutes. The frequency of measuring and/or transmitting the dataset may be revised in response to a detected rate of change of the dataset. For instance, the frequency may be increased if the measured parameter is substantially different. The frequency may be decreased if the measured parameter is not substantially different from previous measurements. Additionally, the frequency may be increased in response to an expected environmental event, such as a predicted or expected change in precipitation, outdoor temperature, outdoor relative humidity, wind speed, wind direction, and atmospheric pressure.

The method may comprise transmitting to the external controller a first dataset comprising at least one value for the measured parameter of the fluid or the treating agent. The first dataset may comprise more than one value for the measured parameter. For example, the first dataset may comprise two, three, four, five, ten, or more values for the measured parameter. The external controller may be configured to process the more than one value into an input value. For instance, the external controller may average the more than one value to calculate an input value. The more than two values may be measured within a short period of time, for example, within 5 minutes, 2 minutes, 1 minute, 30 seconds, or 15 seconds.

The method may comprise determining a treatment regimen responsive to the at least one value, for example, responsive to the input value. In some embodiments, the external controller may be programmed to automatically determine the treatment regimen from the at least one value. The treatment regimen may refer to current operating parameters of the system. For example, the treatment regimen may include current volume of treating agent in the fluid, current dosing or flow rate of the treating agent into the fluid, waste fluid composition, and composition of the headspace of the waste fluid.

The method may comprise comparing the treatment regimen to a reference protocol to determine whether the chemical dosing subsystem requires adjustment. In some embodiments, the external controller may be programmed to automatically compare the treatment regimen to the reference protocol to determine whether the chemical dosing subsystem requires adjustment. The reference protocol may refer to a desired or ideal operating parameter of the system. For example, the reference protocol may include desired or ideal volume of treating agent in the fluid, desired or ideal dosing or flow rate of the treating agent into the fluid, waste fluid composition, and composition of the headspace of the waste fluid. In some embodiments, the reference protocol may refer to operating instructions provided to the chemical dosing subsystem.

The reference protocol may be selected, for example, manually provided to the external controller. In some embodiments, the reference protocol may be determined responsive to data retrieved from a database. For instance, the reference protocol may be determined responsive to historical values for the at least one measured parameter, historical data for the treatment regimen, and/or historical, measured, or predictive environmental data. The environmental data may include change in precipitation, outdoor temperature, outdoor relative humidity, wind speed, wind direction, and atmospheric pressure.

In some embodiments, the reference protocol may be determined responsive to a measured parameter, for example, responsive to a second value of the measured parameter. The methods may comprise transmitting to the external controller a second dataset comprising at least one value for the measured parameter of the fluid or the treating agent. The second dataset may be measured and/or transmitted by the sensor or a second sensor. The second dataset may be associated with the pump or a second pump. The second dataset may comprise more than one value for the measured parameter. For example, the second dataset may comprise two, three, four, five, ten, or more values for the measured parameter. The external controller may be configured to process the more than one value into a second input value. For instance, the external controller may average the more than one value to calculate a second input value. The more than two values may be measured within a short period of time, for example, within 5 minutes, 2 minutes, 1 minute, 30 seconds, or 15 seconds.

Thus, the method may comprise determining that the chemical dosing subsystem requires adjustment, for example, if the treatment regimen is outside a threshold range of the reference protocol. The treatment regimen being outside range of the reference protocol may indicate that there is an unexpected discrepancy between the actual operation of the chemical dosing subsystem and the operating instructions provided to the chemical dosing subsystem. For instance, the variance may indicate there is a leak in a pipe of the chemical dosing subsystem or the source of the chemical dosing subsystem, a clog or crystallization of the treating agent in the pump or a pipe, or other unexpected event.

The chemical dosing subsystem may require adjustment if the treatment regimen is outside a reference threshold of the reference protocol. The reference threshold may be a dose rate having a variance greater than 1% from the reference protocol dose rate, for example, greater than 3%, greater than 5%, greater than 10%, or greater than 15% variance from the reference protocol dose rate. In some embodiments, the external controller may automatically determine whether the treatment regimen is within the reference threshold. In some embodiments, the external controller may automatically determine that the chemical dosing subsystem requires adjustment responsive to the comparison of the treatment regimen and the reference protocol.

Responsive to the chemical dosing subsystem requiring adjustment, the method may further comprise transmitting to the chemical dosing subsystem instructions to initiate an adjustment protocol. In some embodiments, the external controller may automatically transmit to the chemical dosing subsystem the instructions to initiate an adjustment protocol.

The adjustment protocol may comprise operating the pump at an increased speed for a predetermined period of time. The increased speed may be a speed effective to clear a clog or crystallization of the treating agent in the pump or a pipe of the chemical dosing subsystem. In some embodiments, the adjustment protocol comprises operating the pump at 75% to 100% of a maximum speed, for example, 85% to 100%, 90% to 100%, or about 100% of the maximum speed of the pump. The predetermined period of time may be, for example, between about 1-3 minutes, between about 3-5 minutes, between about 5-10 minutes, or between about 10-30 minutes.

The adjustment protocol may comprise operating the pump at a fractional speed. The fractional speed may be about 10% to 50% of a maximum speed of the pump, for example, 25% to 50%, 40% to 50%, or about 50% of the maximum speed of the pump. The method may comprise measuring flow rate of the treating agent into the fluid during the fractional speed operation to determine at least one value for the measured flow rate. The method may comprise comparing the value of the measured flow rate to a reference flow rate range to determine whether the chemical dosing subsystem requires an additional adjustment.

In some embodiments, the method may comprise performing more than one measurement for the flow rate of the treating agent during the fractional operation. The method may comprise obtaining at least two, three, four, five, ten, or more values for the flow rate. The more than two values may be measured within a short period of time, for example, within 5 minutes, 2 minutes, 1 minute, 30 seconds, or 15 seconds. The reference flow rate range may be a flow rate being within a threshold discrepancy from a reference or input flow rate, for example, within 1% from a reference or input flow rate, for example, within 3%, within 5%, within 10%, or within 15% from the reference flow rate or input flow rate. The measured flow rate being within the reference flow rate range may indicate that the adjustment protocol was successful. Thus, if the measurement for the flow rate is within the reference flow rate range, the chemical dosing subsystem may continue operation.

In some embodiments, the method may comprise transmitting to the external controller a dataset comprising the at least one value for the measured flow rate of the treating agent during the fractional operation. The dataset may comprise more than one value for the measured flow rate. The external controller may be configured to process the more than one value into a flow rate value. For instance, the external controller may average the more than one value to calculate a flow rate value. The external controller may be configured to compare the dataset or flow rate value to the reference flow rate range to determine whether the chemical dosing subsystem requires an additional adjustment. In some embodiments, the external controller may process the value for the measured flow rate, compare the flow rate value, and/or determine whether the chemical dosing subsystem requires an additional adjustment automatically.

In some embodiments, if the system or chemical dosing subsystem comprises more than one pump, the adjustment protocol may comprise shutting off a first pump and operating a second pump at the fractional speed. The method may comprise measuring flow rate of the treating agent into the fluid during the fractional speed operation of the selected pump and comparing the measured flow rate to the reference flow rate range to determine whether the selected pump requires an additional adjustment. The method may be repeated with the first pump or any subsequent pump to determine which pump, if any, requires an additional adjustment.

The method may comprise determining whether any adjustment protocol described herein was successful, for example, by measuring flow rate and comparing the measured flow rate to a reference flow rate range as previously described. The measured flow rate being within the reference flow rate range may indicate that the adjustment protocol was successful. The measured flow rate value being outside a threshold discrepancy of the reference flow rate range may indicate that the adjustment protocol was unsuccessful. Responsive to the adjustment protocol being successful, the chemical dosing subsystem may continue operation. Responsive to the adjustment protocol being unsuccessful, the method may further comprise transmitting to the chemical dosing subsystem instructions to initiate an additional adjustment protocol. The additional adjustment protocol may include running the pump at an increased speed, running the pump at a fractional speed, or running first and second pumps at a fractional speed, as previously described.

In some embodiments, the method may comprise, after terminating an adjustment protocol, transmitting to the external controller a dataset comprising at least one value for the measured flow rate to determine whether the adjustment protocol was successful. The external controller may be configured to determine whether the adjustment protocol was successful automatically. Responsive to the external controller determining that the adjustment protocol was successful, the external controller may transmit instructions to the chemical dosing subsystem to continue operation. Responsive to the external controller determining the adjustment protocol was unsuccessful, the external controller may transmit instructions to the chemical dosing subsystem to initiate an additional adjustment protocol, as previously described.

In some embodiments, an indicator of activity of the chemical dosing subsystem is selected from volume of the source of the treating agent and number of revolutions of the pump. The method may comprise measuring a value for the indicator and comparing the indicator value to a reference value to determine whether the chemical dosing subsystem requires adjustment. The value for the indicator may be measured by a volumetric meter or by a processor of the pump. The reference value may include an instructed or expected value for the indicator, for example, an expected volume of the source of the treating agent or number of revolutions of the pump in accordance with the instructed operating parameters of the chemical dosing subsystem.

A discrepancy between the indicator and the reference value may indicate that the there is a leak in a pipe of the chemical dosing subsystem or the source of the chemical dosing subsystem, a clog or crystallization of the treating agent in the pump or a pipe, or other unexpected event. Responsive to the measured indicator value being outside a threshold discrepancy of the reference value, the method may comprise instructing the chemical dosing subsystem to initiate an adjustment protocol as previously described.

In some embodiments, the method may comprise transmitting to the external controller a dataset comprising at least one value for the measured indicator of the chemical dosing subsystem activity. The external controller may be configured to compare the dataset to the reference protocol to determine whether the chemical dosing subsystem requires adjustment automatically.

In some embodiments, the method further comprises deploying at least one second sensor to the waste collection system. The method may comprise operably connecting the second sensor to the external controller. The at least one second sensor may be configured to measure the same or a different parameter of the fluid or the treating agent as the first deployed sensor. The at least one second sensor may be positioned proximately to the first sensor or remotely from the first sensor.

In some embodiments, the first sensor and the second sensor are flow meters. Each sensor may be positioned to measure flow rate of a treating agent from a respective pump of the system or chemical dosing subsystem. The method may comprise comparing at least one value for a measured flow rate from a first pump to at least one value for a measured flow rate from a second pump. For instance, the method may comprise transmitting a first dataset comprising at least one value for a measured flow rate from the first pump to the external controller and transmitting at least one second value for a measured from rate from the second pump to the external controller. The controller may be configured to automatically compare the first dataset to the second dataset. The external controller may use one of the first dataset and the second dataset as the reference flow rate range to determine whether one of the pumps requires an adjustment. In some embodiments, the controller may be configured to automatically compare the first dataset and the second dataset to a reference flow rate range to determine whether one or more of the first pump and the second pump requires adjustment, as previously described.

In some embodiments, the first sensor is a flow meter. The first sensor may be positioned to measure flow rate of the treating agent from one or more pumps of the system or chemical dosing subsystem. The second sensor may be configured to measure one or more of flow rate, concentration of the treating agent, concentration of a target species to be treated, pH, temperature, total suspended solids (TSS), total dissolved solids (TDS), biological oxygen demand (BOD), chemical oxygen demand (COD), conductivity, and oxidation reduction potential (ORP). The method may comprise determining the reference flow rate range from a value measured by the second sensor, for example, a dataset comprising at least one value measured by the second sensor. In some embodiments, at least one value measured by the second sensor may be transmitted to the external controller. The external controller may be configured to determine the reference flow rate range responsive to the dataset or at least one value measured by the second sensor, for example.

Figure 5:
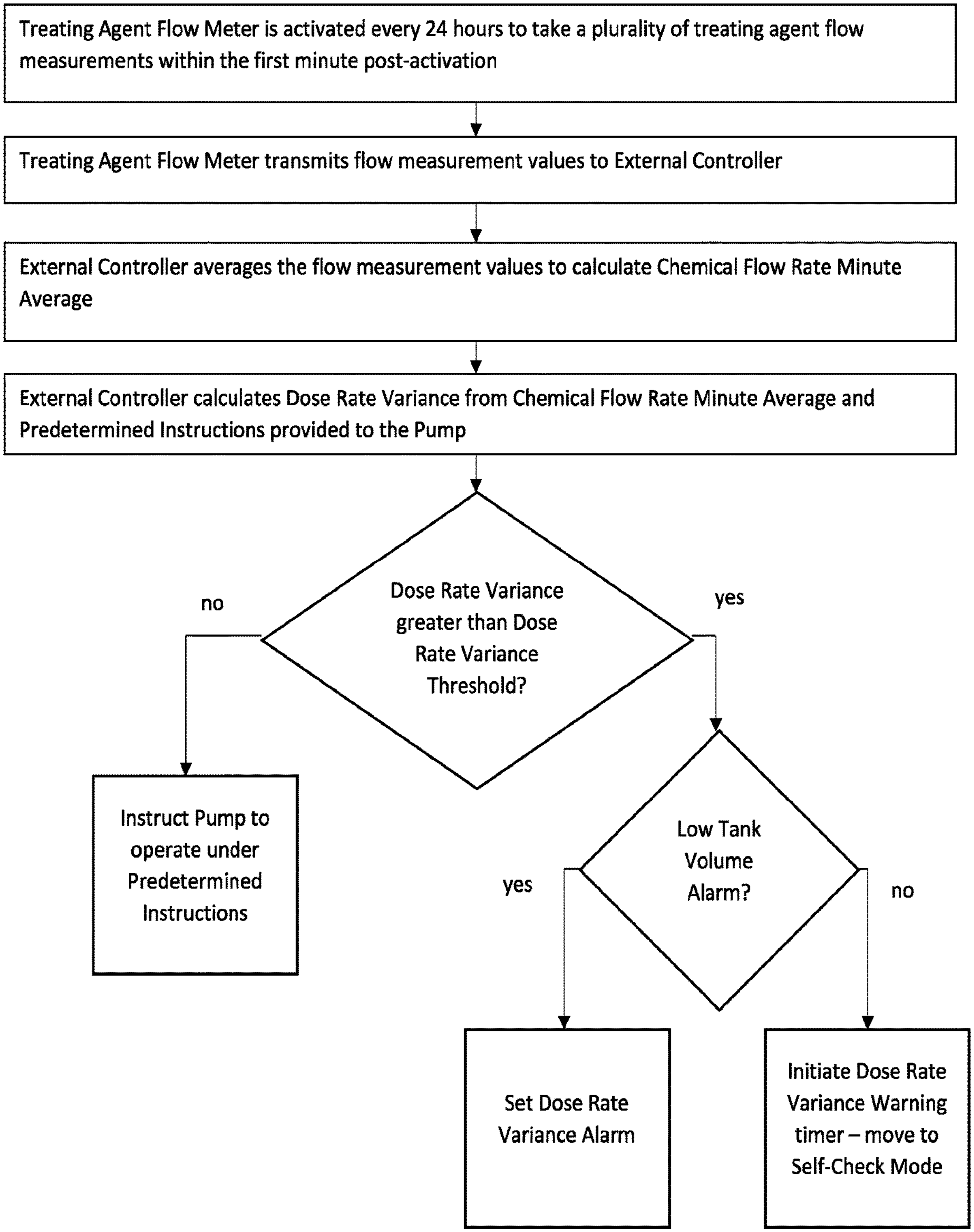
FIG. 5 is a flow chart of a method of monitoring a chemical dosing subsystem, in accordance with one embodiment.

FIG. 5 is a flow chart of a method of monitoring a chemical dosing subsystem. As shown in FIG. 5, a flow meter may be activated periodically, for example, every 24 hours. The flow meter may measure treating agent flow rate into the fluid within the waste collection system. The flow meter may take a plurality of measurements within a predetermined time period, for example, three measurements within one minute post-activation. The flow measurements may be averaged to obtain a value for the flow rate. A treatment regimen or "dose rate variance" may be calculated from the difference between the averaged flow rates and operating instructions provided to the pump. If the dose rate variance is less than a predetermined threshold, the pump may continue to operate under the operating instructions. If the dose rate variance is greater than a predetermined threshold, and the tank volume is sufficient, the controller may instruct the pump to initiate an adjustment protocol. If the dose rate variance is greater than a predetermined threshold, and the tank volume is not sufficient, the controller may activate an alarm and notify a user.

Figure 6:
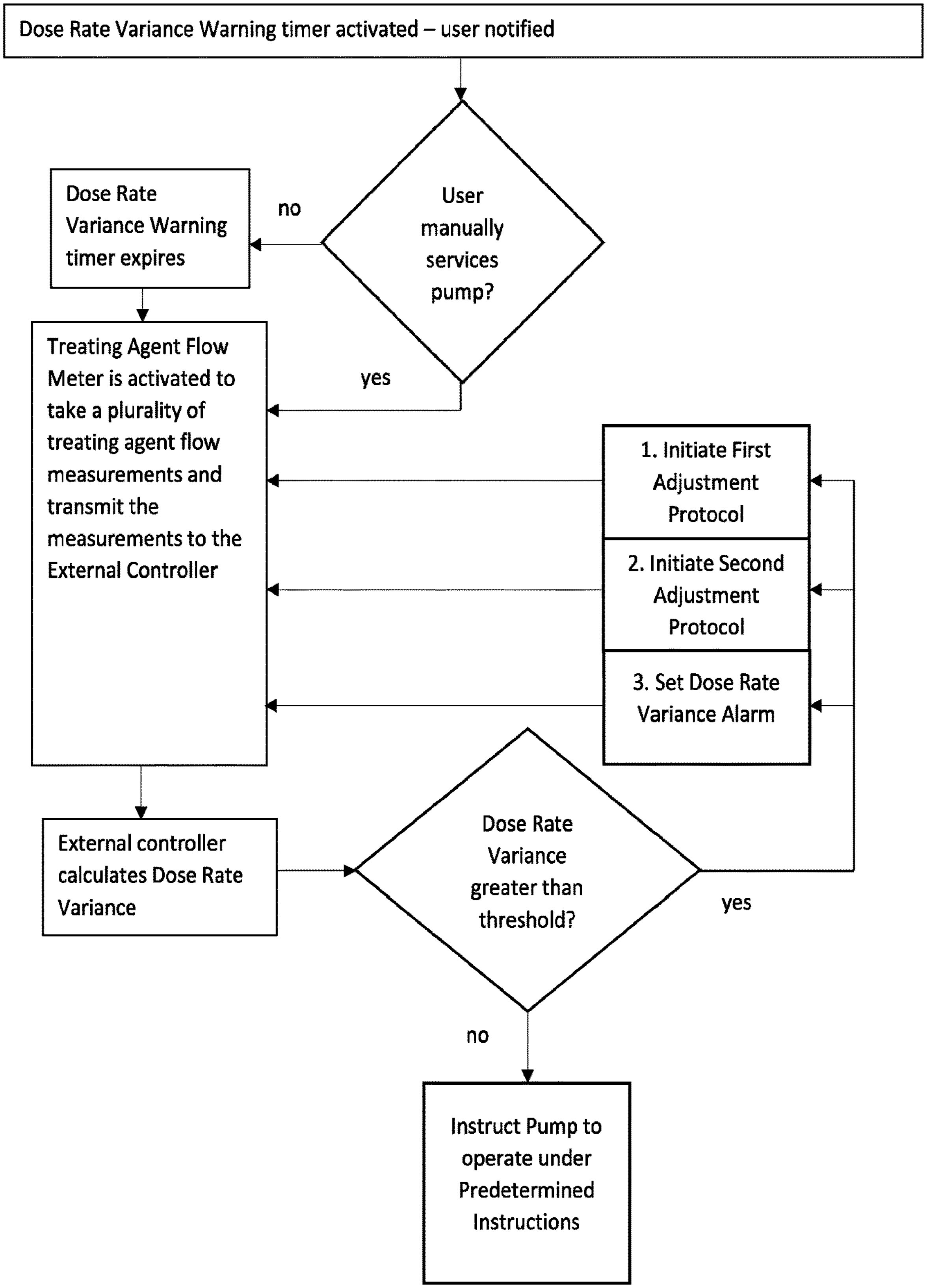
FIG. 6 is a flow chart of a chemical dosing subsystem adjustment protocol, in accordance with one embodiment.

FIG. 6 is a flow chart of a chemical dosing subsystem adjustment protocol. As shown in FIG. 6, if a dose rate variance exists, the user is notified. The user has an opportunity to manually service the one or more pump. After the user services the pump or if the warning expires, the external controller may initiate the Self-Check mode. The treating agent flow meter may measure treating agent flow rate into the fluid within the waste collection system. The flow meter may take a plurality of measurements within a predetermined time period. The flow measurements may be averaged to obtain a value for the flow rate. A treatment regimen or dose rate variance may again be calculated from the difference between the averaged flow rates and operating instructions provided to the pump. If the dose rate variance is less than a predetermined threshold, the pump may continue to operate under the operating instructions. If the dose rate variance is greater than a predetermined threshold, the external controller may instruct the pump to initiate an adjustment protocol. The flow meter may take new measurements and a new dose rate variance may be calculated. If the new dose rate variance is less than the predetermined threshold, the first adjustment was successful and the pump may continue to operate under the operating instructions. If the new dose rate variance is greater than the predetermined threshold, the adjustment was not successful and the external controller may initiate a second adjustment protocol and calculate a new dose rate variance again. If the new dose rate variance is less than the predetermined threshold, the second adjustment was successful and the pump may continue to operate under the operating instructions. If the new dose rate variance is greater than the predetermined threshold, the second adjustment was not successful and a user may be notified. The chemical dosing subsystem may then require manual service.

In accordance with another aspect, there is provided a method of treating a fluid in a waste collection system. The waste collection system may contain a chemical dosing subsystem. The chemical dosing subsystem may be programmed to operate under a predetermined treatment protocol. The predetermined treatment protocol may be manually selected or selected responsive to data retrieved from the database.

The method may comprise deploying at least one sensor to the waste collection system. The method may comprise transmitting to the external controller a dataset comprising at least one value for the at least one measured parameter of the fluid or the treating agent. The external controller may be configured to determine a treatment regimen responsive to the at least one value and data retrieved from a database.

In some embodiments, the measured parameter may be flow rate of the treating agent. In some embodiments, the measured parameter may be associated with a rate of introducing the treating agent into the fluid. Thus, the data transmitted to the external controller may be associated with operation of the chemical dosing subsystem. The data retrieved from the database may comprise historical values for the at least one measured parameter, historical data for the treatment regimen, and/or historical, measured, or predictive environmental data.

The method may comprise transmitting to the chemical dosing subsystem data comprising the treatment regimen. Responsive to receiving the data comprising the treatment regimen, the chemical dosing subsystem may be configured to adjust the predetermined treatment protocol to produce an adjusted treatment protocol. In some embodiments, the external controller may be configured to transmit instructions to the chemical dosing subsystem to operate in accordance with the adjusted treatment protocol.

Accordingly, treatment of the waste within the waste collection system may be adjusted responsive to one or more measured parameter indicating operation of the system and data obtained from the database. The adjustment of the protocol may be performed periodically, for example, every day, every week, bi-weekly, every month, bi-monthly, every three months, quarterly, every six months, or annually. The frequency of the adjustment may be increased responsive to the degree of the adjustment exceeding a threshold value. The frequency of the adjustment may be decreased responsive to the degree of the adjustment being within the threshold value. In general, the external controller may be configured to automatically request transmission of the dataset comprising at least one value for the at least one measured parameter of the fluid or the treating agent and, optionally, determine how often to request the transmission. The external controller may then be configured to determine the treatment regimen and adjust the predetermined treatment protocol to produce the adjusted treatment protocol automatically.

Figure 7:
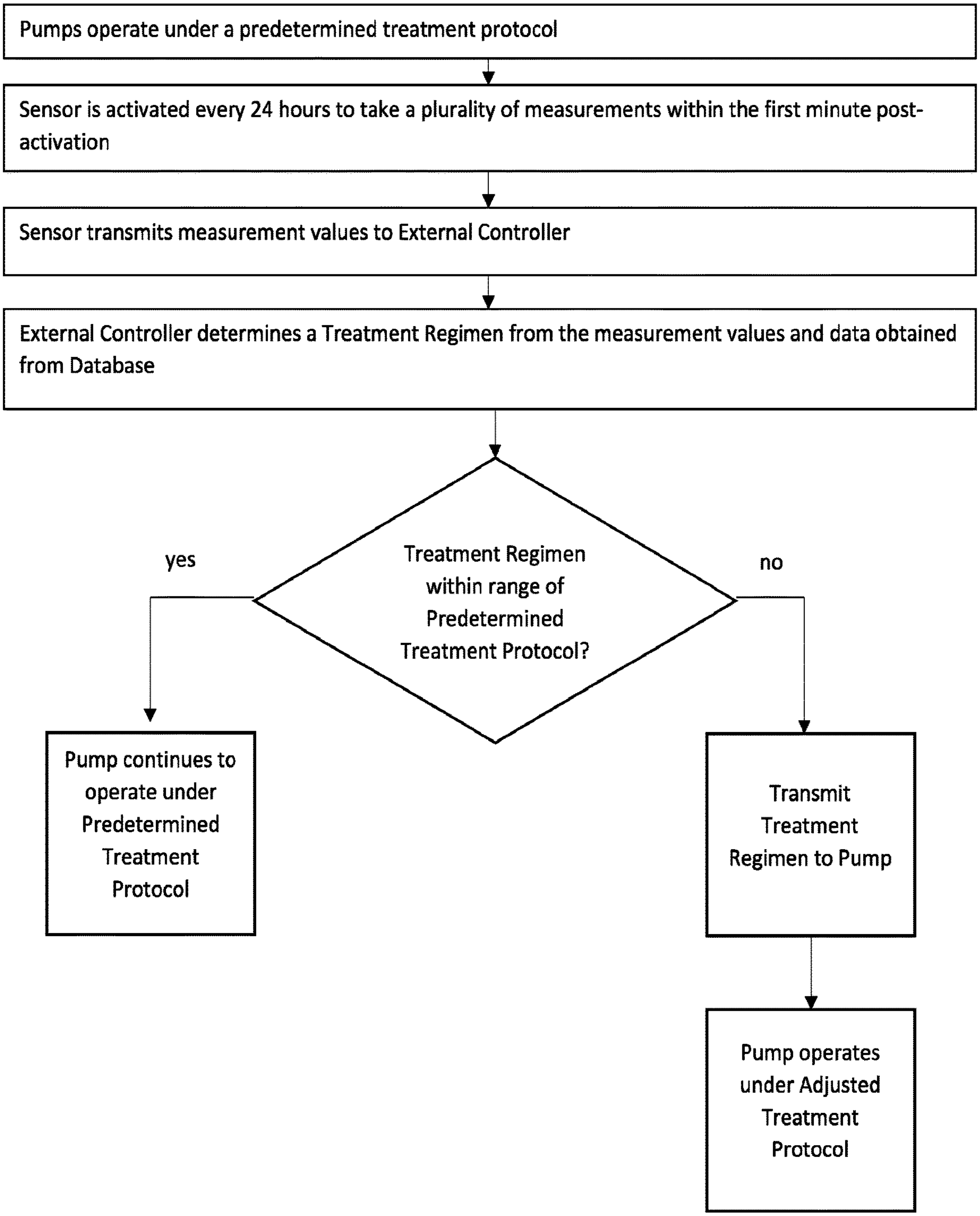
FIG. 7 is a flow chart of a method of treating water, in accordance with one embodiment.

FIG. 7 is a flow chart of a method of treating a fluid in a waste collection system. As shown in FIG. 7, one or more pumps of the system may operate under a predetermined treatment protocol. The sensor may be activated periodically, as previously described, to take a plurality of measurements of the fluid or treating agent. The sensor may transmit the measurement values to the external controller. The external controller may determine a treatment regimen responsive to the measurement values and data obtained from a database. If the treatment regimen is within range of the predetermined treatment protocol, the pump may continue to operate under the predetermined treatment protocol. If the treatment regimen outside a threshold of the predetermined treatment protocol, the external controller may transmit instructions to the pump. The pump may then operate under the adjusted treatment protocol.

In accordance with another aspect, there is provided a method of providing odor and/or corrosion control in a wastewater stream collection system or treatment facility. The method may comprise measuring at least one parameter of a fluid in a wastewater stream collection system, determining a treatment dose of a treating agent based on an adjustment factor, the adjustment factor determined responsive to a measurement of the at least one process variable, the treatment dose being in an amount sufficient to control a concentration of an odorous species in a headspace of the wastewater stream collection system or treatment facility to be less than or equal to a predetermined target value at a point in the wastewater stream collection system, and administering the treatment dose to wastewater in the wastewater stream collection system. The method may comprise retrieving data for at least one environmental variable from a source of environmental data. The adjustment factor may then be determined responsive also to a measurement of the at least one process variable and data received for the at least one environmental variable.

In some embodiments, the at least one parameter of the fluid may be selected from volume of the treating agent previously administered, concentration of the odorous species in the headspace, wastewater composition, wastewater pH, wastewater temperature, wastewater flow rate, wastewater conductivity, wastewater TSS, wastewater TDS, wastewater ORP, biological oxygen demand of the wastewater, chemical oxygen demand of the wastewater, sulfide concentration in the wastewater, residual treating agent in the wastewater, and humidity in the collection system. In some embodiments, the at least one environmental variable is selected from precipitation, outdoor temperature, outdoor relative humidity, wind speed, wind direction, and atmospheric pressure.

In some embodiments, the treatment dose of the treating agent is based on a baseline dose of the treating agent. The baseline dose may be determined based on at least one temporal variable, for example, obtained from a database. The baseline dose may be predicted from historical data regarding concentrations of the odorous species in the headspace. The historical data may be catalogued by time of day, day of week, month of the year, and annual seasonal data. In some embodiments, the baseline dose may be manually set.

EXAMPLE

The function and advantages of these and other embodiments can be better understood from the following example. The example is intended to be illustrative in nature and not considered to be limiting the scope of the invention.

Example: Prophetic Adjustment Protocol

A system including a flow meter and two dosing agent pumps may operate under the following protocol. In particular, an external controller operably connected to the flow meter and pumps may initiate and execute the following protocol.

Activating the Dose Rate Variance Warning

The criteria for triggering a Dose Rate Variance Warning are described below. The external controller will receive a plurality of measurements of treating agent flow rate from the flow meter taken at selected intervals. Here, three measurements are taken in a 1-minute period. The intervals are selected to be the 30 second, 40 second, and 50 second mark of each minute. The three flow rate measurements are averaged to calculate the Chemical Flow Rate Minute Average (CFRMA). The Dose Rate Variance is calculated in accordance with equation (1).

$$\text{Dose Rate Variance (ml/min)}=(P1+P2)-\text{CFRMA} \quad (1)$$

Where:

P1 is the current dosage rate as instructed to the first pump; and

P2 is the current dosage rate as instructed to the second pump.

The Dose Rate Variance Warning is indicated if the absolute value of the Dose Rate Variance is greater than the Dose Rate Variance Threshold setpoint. If the Dose Rate Variance Warning is indicated and there is not a Low Tank Volume Alarm present, the external controller will start the Dose Rate Variance Warning timer.

Activation of the Dose Rate Variance Warning timer may allow a user to initiate a Self-Check Mode or otherwise provide maintenance to the system. The external controller may repeat the Dose Rate Variance calculation to determine if the Dose Rate Variance has been resolved. Otherwise, if the Dose Rate Variance Warning Timer expires without manual initiation of the Self-Check mode or resolution of the Dose Rate Variance Warning, then the external controller will automatically initiate the pump Self-Check Mode.

Pump Self-Check Mode

The external controller will automatically put the pumps into Self-Check mode, initiating a trouble shooting sequence, if there is a Dose Rate Variance Warning. Pump Self-Check will not be initiated more than once every 24 hours. Pump Self-Check may also be initiated by a user through the external controller or directly at one or both pumps. The pump Self-Check must be successful in order to clear Pump Dose Rate Variance alarms and Dose Rate Variance warnings. The purpose of Self-Check mode is to try to correct dose rate variances due to clogging or other issues, and if the correction is not possible, to determine which pump is causing the dose rate variance for notification to a user.

The sequence of the Self-Check Mode is described below. If the Self-Check Mode has been initiated and neither the first or second pump is in Manual or Calibration Mode, then the external controller will set both pumps to Self-Check Mode and begin the sequence.

1. The external controller will attempt to clear suction/discharge lines by instructing the pumps to operate at a maximum speed for 2 minutes.
2. The external controller will instruct the pumps to operate at half capacity for 2 minutes.
3. The sensor will measure treating agent flow rate at the 30 second, 1 minute, and 90 second marks and transmit the measurements to the external controller.
4. The external controller will average the three measured flow rates and calculate the difference (error) between the average of the three measured flow rates and the half capacity dose rate (P1+P2), where P1 and P2 are each the half capacity dose rate.
5. The external controller will determine whether a Dose Rate Variance Warning exists as follows:
   A. If the absolute value of the difference/error between the average of the three measured flow rates and the half capacity dose rate is less than the Dose Rate Variance Threshold (using a 5% dead band), then the external controller will terminate the Self-Check Mode and reset the pumps to Dosing Mode, and clear Dose Rate Variance Warning.
   B. If the absolute value of the difference/error between the average of the three measured flow rates and the half capacity dose rate is greater than the Dose Rate Variance Threshold (using a 5% dead band), continue with Pump Self Check steps 6 through 12.
6. The external controller will turn of Pump 2.
7. The external controller will instruct Pump 1 to continue operating at half capacity for 2 minutes.
8. The sensor will measure treating agent flow rate at the 30 second, 1 minute, and 90 second marks and transmit the measurements to the external controller.
9. The external controller will average the three measured flow rates and calculate the difference (error) between the average of the three measured flow rates and the half capacity dose rate P1, where P1 is the half capacity dose rate of Pump 1.
10. The external controller will determine whether a Dose Rate Variance Warning for Pump 1 exists as follows:
   A. If the absolute value of the difference/error between the average of the three measured flow rates and the half capacity dose rate of Pump 1 is less than the Dose Rate Variance Threshold (using a 5% dead band), then the external controller will terminate the Self-Check Mode for Pump 1, turn off Pump 1, and repeat steps 7-9 with Pump 2.
   B. If the absolute value of the difference/error between the average of the three measured flow rates and the half capacity dose rate of Pump 1 is greater than the Dose Rate Variance Threshold (using a 5% dead band), then the external controller will activate the Dose Rate Variance Alarm for Pump 1, turn off Pump 1, and repeat steps 7 through 9 with Pump 2.
11. The external controller will determine whether a Dose Rate Variance Warning for Pump 2 exists as follows:
   A. If the absolute value of the difference/error between the average of the three measured flow rates and the half capacity dose rate of Pump 2 is less than the Dose Rate Variance Threshold (using a 5% dead band), and the external controller terminated the Self-Check Mode for Pump 1, then the external controller will also terminate the Self-Check Mode for Pump 2.
   B. If the absolute value of the difference/error between the average of the three measured flow rates and the half capacity dose rate of Pump 2 is less than the Dose Rate Variance Threshold (using a 5% dead band), and the external controller did not terminate the Self-Check Mode for Pump 1, then the external controller will terminate the Self-Check Mode for Pump 2, and the Dose Rate Variance Alarm for Pump 1 will remain active.
   C. If the absolute value of the difference/error between the average of the three measured flow rates and the half capacity dose rate of Pump 2 is greater than the Dose Rate Variance Threshold (using a 5% dead band), and the external controller terminated the Self-Check Mode for Pump 1, then the external controller will activate the Dose Rate Variance Alarm for Pump 2.

D. If the absolute value of the difference/error between the average of the three measured flow rates and the half capacity dose rate of Pump 2 is greater than the Dose Rate Variance Threshold (using a 5% dead band), and the external controller did not terminate the Self-Check Mode for Pump 1, then the external controller will activate the Dose Rate Variance Alarm for Pump 2, and the Dose Rate Variance Alarm for Pump 1 will remain active.

12. If the Self-Check Mode has been terminated for Pump 1 and Pump 2 (step 10A), then the external controller will terminate the Self-Check Mode and reset the pumps to Dosing Mode, and clear Dose Rate Variance Warning. If the Dose Rate Variance Alarm is activated for Pump 1, Pump 2, or both (Steps 10B-10D), then the external controller may repeat the Self-Check Mode protocol, turn off one or both pumps and notify a user of the Dose Rate Variance, or reset the pumps to Dosing Mode and notify a user of the Dose Rate Variance.

After the Self-Check Mode is completed, the external controller will repeat the Dose Rate Variance calculation. If the Dose Rate Variance is less than the Dose Rate Variance Threshold (here, using a 5% dead band), the external controller will reset the Dose Rate Variance Warning timer. Resetting the Dose Rate Variance Warning timer will clear the Dose Rate Variance Warning and clear any Pump Dose Rate Variance alarm until the following Dose Rate Variance calculation is initiated, here at 24 hours from the prior calculation. The external controller will instruct the pumps to operate under Dosing Mode.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure and are intended to be within the scope of the invention. Accordingly, the foregoing description and drawings are by way of example only.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed.

What is claimed is:

1. A method of monitoring a chemical dosing subsystem configured to treat a fluid in a waste collection system, the chemical dosing system comprising a source of a treating agent and a pump configured to introduce the treating agent into the fluid, the method comprising:

Deploying at least one sensor to the waste collection system, the at least one sensor configured to measure at least one parameter of the fluid or the treating agent introduced by the chemical dosing subsystem into the fluid;

Transmitting to an external controller a first dataset comprising at least one value for the at least one measured parameter of the fluid or the treating agent, the external controller configured to determine a treatment regimen responsive to the at least one value;

Comparing the treatment regimen to a reference protocol to determine whether the chemical dosing subsystem requires adjustment;

Responsive to the chemical dosing subsystem requiring adjustment, transmitting to the chemical dosing subsystem instructions to initiate an adjustment protocol comprising operating the pump at an increased speed for a predetermined period of time;

After terminating the adjustment protocol, transmitting to the external controller a second dataset comprising at least one value for the at least one measured parameter of the fluid or the treating agent, the external controller configured to compare the second dataset to the first dataset or a reference dataset to determine whether the adjustment protocol was successful; and Responsive to the adjustment protocol being unsuccessful, transmitting to the chemical dosing subsystem instructions to initiate a second adjustment protocol, the second adjustment protocol comprising:

Operating the pump at a fractional speed;

Measuring flow rate of the treating agent into the fluid;

Transmitting to the external controller a third dataset comprising at least one value for the measured flow rate of the treating agent; and Comparing the third dataset to a reference flow rate range to determine whether the chemical dosing subsystem requires a third adjustment.

2. The method of claim 1, wherein the reference protocol is determined responsive to data retrieved from a database.

3. The method of claim 1, wherein the reference protocol is determined responsive to a second dataset comprising at least one value for the at least one measured parameter of the fluid or the treating agent.

4. The method of claim 1, wherein the chemical dosing subsystem comprises more than one pump configured to introduce the treating agent into the fluid, and responsive to the third dataset being outside a threshold discrepancy of the reference flow rate range, transmitting to the chemical dosing subsystem instructions to initiate the third adjustment protocol, the third adjustment protocol comprising:

Shutting off a first pump;

Operating a second pump at a fractional speed; measuring flow rate of the treating agent into the fluid;

Transmitting to the external controller a fourth dataset comprising at least one value for the measured flow rate of the treating agent; and Comparing the fourth dataset to the reference flow rate range to determine whether the chemical dosing subsystem requires a fourth adjustment.

5. The method of claim 1, further comprising deploying at least one second sensor to the waste collection system, the at least one second sensor configured to measure the at least one parameter of the fluid or the treating agent.

6. The method of claim 1, further comprising transmitting to the external controller a second dataset comprising at least one value for an indicator of the chemical dosing subsystem activity and comparing the second dataset to the reference protocol to determine whether the chemical dosing subsystem requires adjustment.

7. The method of claim 6, wherein the chemical dosing subsystem comprises a source of the treating agent and a pump configured to introduce the treating agent into the fluid, and the indicator comprises at least one of volume of the source of the treating agent and number of revolutions of the pump.

8. A method of treating a fluid in a waste collection system having a chemical dosing subsystem comprising a source of a treating agent and a pump configured to introduce at least one treating agent into the fluid in accordance with a predetermined treatment protocol, the method comprising:

Deploying at least one sensor to the waste collection system, the at least one sensor configured to measure at least one parameter of the fluid or the at least one treating agent;

Transmitting to an external controller a first dataset comprising at least one value for the at least one measured parameter of the fluid or the treating agent, the external controller configured to determine a treatment regimen responsive to the at least one value and data retrieved from a database;

Transmitting to the chemical dosing subsystem data comprising the treatment regimen, the chemical dosing subsystem configured to adjust the predetermined treatment protocol responsive to the treatment regimen to produce an adjusted treatment protocol;

Comparing the treatment regimen to a reference protocol to determine whether the chemical dosing subsystem requires adjustment;

Responsive to the chemical dosing subsystem requiring adjustment, transmitting to the chemical dosing subsystem instructions to initiate an adjustment protocol comprising operating the pump at an increased speed for a predetermined period of time;

After terminating the adjustment protocol, transmitting to the external controller a second dataset comprising at least one value for the at least one measured parameter of the fluid or the treating agent, the external controller configured to compare the second dataset to the first dataset or a reference dataset to determine whether the adjustment protocol was successful; and Responsive to the adjustment protocol being unsuccessful, transmitting to the chemical dosing subsystem instructions to initiate a second adjustment protocol, the second adjustment protocol comprising:

Operating the pump at a fractional speed;

Measuring flow rate of the treating agent into the fluid;

Transmitting to the external controller a third dataset comprising at least one value for the measured flow rate of the treating agent; and Comparing the third dataset to a reference flow rate range to determine whether the chemical dosing subsystem requires a third adjustment.

9. The method of claim 8, wherein the at least one parameter of the treating agent is flow rate of the at least one treating agent into the fluid.

10. The method of claim 8, wherein the at least one parameter of the fluid is associated with a rate of introducing the at least one treating agent into the fluid.

11. The method of claim 10, wherein the at least one parameter of the fluid comprises flow rate, concentration of the treating agent, concentration of a target species to be treated, pH, temperature, total suspended solids (TSS), total dissolved solids (TDS), biological oxygen demand (BOD), chemical oxygen demand (COD), conductivity, and oxidation reduction potential (ORP).

12. The method of claim 8, wherein the data retrieved from the database comprises historical values for the at least one measured parameter, historical data for the treatment regimen, and/or historical, measured, or predictive environmental data.

13. A waste treatment management system comprising:

A waste collection system directed to a principal processing facility;

A chemical dosing subsystem comprising a source of at least one treating agent and at least one pump configured to introduce the at least one treating agent into a fluid within the waste collection system in accordance with a predetermined treatment protocol;

A sensing subsystem comprising at least one sensor configured to measure at least one parameter of the fluid or the at least one treating agent; and An external controller operably connected to the chemical dosing subsystem and the sensing subsystem, the external controller configured to:

Receive a first dataset comprising at least one value for the at least one measured parameter of the fluid or the at least one treating agent;

Determine a treatment regimen responsive to the at least one value;

Compare the treatment regimen to a reference protocol to determine whether the chemical dosing subsystem requires adjustment;

Responsive to the chemical dosing subsystem requiring adjustment, transmit to the chemical dosing subsystem instructions to initiate an adjustment protocol comprising operating the pump at an increased speed for a predetermined period of time;

After termination of the adjustment protocol, receive a second dataset comprising at least one value for the at least one measured parameter of the fluid or the at least one treating agent;

Compare the second dataset to the first dataset or a reference dataset to determine whether the adjustment protocol was successful; and Responsive to the adjustment protocol being unsuccessful, transmit to the chemical dosing subsystem instructions to initiate a second adjustment protocol, the second adjustment protocol comprising operating the pump at a fractional speed;

Receive a third dataset comprising at least one value for measured flow rate of the treating agent into the fluid; and Compare the third dataset to a reference flow rate range to determine whether the chemical dosing subsystem requires a third adjustment.

14. The waste treatment management system of claim 13, wherein the controller is further configured to transmit to the chemical dosing subsystem the treatment regimen, the chemical dosing subsystem further configured to adjust the predetermined treatment protocol responsive to the treatment regimen to produce an adjusted treatment protocol.

15. The waste treatment management system of claim 13, wherein the chemical dosing subsystem comprises more than one pump, each pump comprising a transmitter and receiver operably connected to the external controller.

16. The waste treatment management system of claim 13, wherein the at least one sensor configured to measure a parameter of the treating agent is a flow meter or volumetric meter.

* * * * *